(12) United States Patent
Jiang et al.

(10) Patent No.: US 11,167,426 B2
(45) Date of Patent: Nov. 9, 2021

(54) ROBOT WITH GRIPPER AND FIBRILLAR, DIRECTIONAL ADHESIVE ASSEMBLY

(71) Applicant: Flexiv Ltd., Santa Clara, CA (US)

(72) Inventors: Hao Jiang, Mountain View, CA (US); Shiquan Wang, Foster City, CA (US)

(73) Assignee: Flexiv Ltd., Grand Cayman (KY)

( * ) Notice: Subject to any disclaimer, the term of this patent is extended or adjusted under 35 U.S.C. 154(b) by 163 days.

(21) Appl. No.: 16/444,207

(22) Filed: Jun. 18, 2019

(65) Prior Publication Data
US 2020/0398438 A1 Dec. 24, 2020

(51) Int. Cl.
*B25J 15/00* (2006.01)

(52) U.S. Cl.
CPC .................. *B25J 15/008* (2013.01)

(58) Field of Classification Search
CPC .. B25J 15/008; B25J 15/0023; B25J 15/0085; B25J 15/28; B25J 15/0052; C09J 7/00; C09J 2301/31; B32B 7/12; B32B 2307/546; B32B 2405/00
See application file for complete search history.

(56) References Cited

U.S. PATENT DOCUMENTS

| | | | | |
|---|---|---|---|---|
| 7,762,362 B2* | 7/2010 | Cutkosky | ............. | B62D 57/024 180/8.5 |
| 2006/0202355 A1* | 9/2006 | Majidi | ....................... | C09J 7/10 257/783 |
| 2014/0036404 A1 | 2/2014 | Prahlad et al. | | |
| 2014/0065347 A1 | 3/2014 | Sitti et al. | | |
| 2014/0272272 A1* | 9/2014 | Spenko | .................. | B29C 39/026 428/113 |
| 2016/0029437 A1* | 1/2016 | Grohmann | ............. | B25J 15/008 219/486 |
| 2016/0200945 A1 | 7/2016 | Hawkes et al. | | |
| 2017/0066138 A1 | 3/2017 | Hawkes | | |
| 2018/0264657 A1* | 9/2018 | Dadkhah Tehrani | ..... | B81C 1/00 |
| 2019/0006116 A1 | 1/2019 | Petrzilek et al. | | |

FOREIGN PATENT DOCUMENTS

WO WO 2019/038744 2/2019

OTHER PUBLICATIONS

International Search Report for International Application No. PCT/IB2018/056513, dated Dec. 7, 2018; (13 pages).

* cited by examiner

*Primary Examiner* — Stephen A Vu
(74) *Attorney, Agent, or Firm* — K&L Gates LLP

(57) ABSTRACT

The present disclosure discloses a fibrillar, directional adhesive assembly, a gripper, and a robot including a gripper. In one embodiment, the fibrillar, directional adhesive assembly includes a carriage, a layer of fibrillar, directional adhesive, and at least one load component. The carriage may have a first lateral side and a second lateral side adjacent to the first lateral side and the at least one load component may connect the layer of fibrillar, directional adhesive to the first lateral side and the second lateral side. The load component may be capable of loading shear force from the carriage to the layer of fibrillar, directional adhesive along a first direction and a second direction substantially perpendicular to the first direction.

15 Claims, 6 Drawing Sheets

ROBOT WITH GRIPPER AND FIBRILLAR, DIRECTIONAL ADHESIVE ASSEMBLY

TECHNICAL FIELD

The present disclosure generally relates to grasping devices, and in particular to a fibrillar, directional adhesive assembly, a gripper and a robot.

BACKGROUND

Fibrillar, directional adhesives are mostly dry, synthetic-made adhesive assemblies inspired by gecko adhesion. Such adhesives may be implemented in grasping devices and mechanisms for improved grasping flat or curved surfaces. Fibrillar, directional adhesives produce negligible adhesion unless a loading shear force is applied to activate the adhesive surfaces.

Common fibrillar, directional adhesive assemblies may utilize tendons to load the adhesive. These tendons typically attach only to the adhesive tiles along a preferred shear direction of the adhesive. Compliant elements may attach to backings of the adhesive patches. Such configurations limit the load capacity of the fibrillar adhesive due to stress concentration on the adhesive and because the adhesion profile trajectory is not optimized.

SUMMARY

The present disclosure provides exemplary, improved fibrillar, directional adhesive assemblies, as well as gripper units and robots that use these improved assemblies. In one embodiment, a fibrillar, directional adhesive assembly is provided. The fibrillar, directional adhesive assembly may comprise a carriage having a first lateral side and a second lateral side adjacent to the first lateral side and a layer of fibrillar, directional adhesive. The fibrillar, directional adhesive assembly may also include at least one load component connecting the layer of fibrillar, directional adhesive, the first lateral side, and the second lateral side of the carriage, wherein the load component is capable of loading shear force from the carriage to the layer of fibrillar, directional adhesive along a first direction and a second direction substantially perpendicular to the first direction.

In another embodiment, the fibrillar, directional adhesive assembly further comprises a backing component to which the layer of fibrillar, directional adhesive is attached. The at least one load component may also connect to the layer of fibrillar, directional adhesive through the backing component.

In a further embodiment, the at least one load component comprises a first load component connecting the backing component and the first lateral side of the carriage, wherein the first load component is capable of loading shear force from the carriage to the layer of fibrillar, directional adhesive along the first direction. The at least one load component may further comprise a second load component connecting the backing component and the second lateral side of the carriage, wherein the second load component is capable of loading shear force from the carriage to the layer of fibrillar, directional adhesive along the second direction.

In yet another embodiment, the at least one load component is one loading film, and the loading film connects both the first lateral side and the second lateral side of the carriage such that the loading film is capable of loading shear force from the carriage to the layer of fibrillar, directional adhesive along both the first direction and the second direction.

In a still further embodiment, the backing component comprises at least two layers of rigid material stacked together, and the loading film is positioned between the at least two layers of rigid material.

In another embodiment, the fibrillar, directional adhesive assembly further comprises a deformable component. The carriage may also have a bottom surface facing the backing component and the backing component may have a top surface facing the carriage. The deformable component may also attach between the bottom surface of the carriage and the top surface of the backing component.

In a further embodiment, the fibrillar, directional adhesive assembly further comprises a vertical tension component connecting the carriage and the backing component, wherein the vertical tension component transmits a normal load force from the carriage to the layer of fibrillar, directional adhesive along a third direction substantially perpendicular to the first direction and the second direction.

In yet another embodiment, at least a portion of the at least one load component which connects to the first side of the carriage extends substantially parallel to the layer of fibrillar, directional adhesive.

In a still further embodiment, a gripper is provided comprising a frame and at least two fibrillar, directional adhesive assemblies slidably connected to the frame and arranged in differing directions. Each of the at least two fibrillar, directional adhesive assemblies may comprise a carriage having a first lateral side and a second lateral side adjacent to the first lateral side, a layer of fibrillar, directional adhesive, and at least one load component. The load component may connect the layer of fibrillar, directional adhesive, the first lateral side, and the second lateral side of the carriage, and may be capable of loading shear force from the carriage to the layer of fibrillar, directional adhesive along a first direction and a second direction substantially perpendicular to the first direction.

In another embodiment, each of the at least two fibrillar, directional adhesive assemblies further comprise a backing component to which the layer of fibrillar, directional adhesive is attached. The at least one load component may also connect to the layer of fibrillar, directional adhesive through the backing component.

In a further embodiment, the at least one load component comprises a first load component connecting the backing component and the first lateral side of the carriage, wherein the first load component is capable of loading shear force from the carriage to the layer of fibrillar, directional adhesive along the first direction. The at least one load component may also comprise a second load component connecting the backing component and the second lateral side of the carriage, wherein the second load component is capable of loading shear force from the carriage to the layer of fibrillar, directional adhesive along the second direction.

In yet another embodiment, the at least one load component is a loading film that connects both the first lateral side and the second lateral side of the carriage such that the loading film is capable of loading shear force from the carriage to the layer of fibrillar, directional adhesive along both the first direction and the second direction.

In a still further embodiment, the backing component comprises at least two layers of rigid material stacked together, and the loading film is positioned between the at least two layers of rigid material.

In another embodiment, wherein each of the at least two fibrillar, directional adhesive assemblies further comprise a deformable component. The carriage may have a bottom surface facing the backing component, the backing component has a top surface facing the carriage, and the deformable component may attach between the bottom surface of the carriage and the top surface of the backing component.

In a further embodiment, each of the at least two fibrillar, directional adhesive assemblies further comprises a vertical tension component connecting between the carriage and the backing component that is capable of transmitting a normal load force from the carriage to the layer of fibrillar, directional adhesive along a third direction substantially perpendicular to the first direction and the second direction. At least a portion of the at least one load component which connects to the first side of the carriage may also extend substantially parallel to the layer of fibrillar, directional adhesive.

In yet another embodiment, fiber angles of the fibrillar, directional adhesive of the at least two fibrillar, directional adhesive assemblies are directed either toward or away from a center of the fibrillar, directional adhesive assembly. The gripper may also further comprise a preloading mechanism configured to drive the two fibrillar, directional adhesive assemblies to slide towards and away from the center of the fibrillar, directional adhesive assembly for activation and deactivation of the gripper.

In a still further embodiment, a robot is provided that includes a gripper comprising a frame and at least two fibrillar, directional adhesive assemblies slidably connected to the frame and arranged in different directions. Each of the at least two fibrillar, directional adhesive assemblies may comprise a carriage having a first lateral side and a second lateral side adjacent to the first lateral side, a layer of fibrillar, directional adhesive, and at least one load component connecting the layer of fibrillar, directional adhesive, the first lateral side, and the second lateral side of the carriage. The at least one load component may be capable of loading shear force from the carriage to the layer of fibrillar, directional adhesive along a first direction and a second direction substantially perpendicular to the first direction.

In another embodiment, each of the at least two fibrillar, directional adhesive assemblies further comprises a backing component to which the layer of fibrillar, directional adhesive is attached. The at least one load component may also connect the layer of fibrillar, directional adhesive through the backing component.

In a further embodiment, the at least one load component comprises a single loading film that connects both the first lateral side and the second lateral side of the carriage such that the loading film is capable of loading shear force from the carriage to the layer of fibrillar, directional adhesive along both the first direction and the second direction. The backing component may also comprise at least two layers of rigid material stacked together, and the loading film may be positioned between the at least two layers of rigid material.

In yet another embodiment, each of the at least two fibrillar, directional adhesive assemblies further comprise a vertical tension component connecting the carriage and the backing component and may be capable of transmitting a normal load force from the carriage to the layer of fibrillar, directional adhesive along a third direction substantially perpendicular to the first direction and the second direction. At least a portion of the at least one load component which connects to the first side of the carriage may also extend substantially parallel to the layer of fibrillar, directional adhesive.

The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

To solve the above-mentioned problem, a technical scheme adopted by the present disclosure is to provide a fibrillar, directional adhesive assembly. The fibrillar, directional adhesive assembly may include a carriage, a layer of fibrillar, directional adhesive and at least one load component. The carriage has a first lateral side and a second lateral side adjacent to the first lateral side. The at least one load component connects the layer of fibrillar, directional adhesive, the first lateral side and the second lateral side of the carriage, and is capable of loading shear force from the carriage to the layer of fibrillar, directional adhesive along a first direction and a second direction substantially perpendicular to the first direction.

To solve the above-mentioned problem, another technical scheme adopted by the present disclosure is to provide a gripper. The gripper may include a frame and at least two fibrillar, directional adhesive assemblies. The fibrillar, directional adhesive assemblies are slidably connected to the frame and are arranged in different directions. Each of the at least two fibrillar, directional adhesive assemblies includes a carriage, a layer of fibrillar adhesive and at least one load component. The carriage has a first lateral side and a second lateral side adjacent to the first lateral side. The at least one load component connects the layer of fibrillar, directional adhesive, the first lateral side and the second lateral side of the carriage, and is capable of loading shear force from the carriage to the layer of fibrillar adhesive along a first direction and a second direction substantially perpendicular to the first direction.

To solve the previously-discussed problems, another technical scheme adopted by the present disclosure is to provide a robot with a gripper. The gripper may include a frame and at least two fibrillar adhesive assemblies. The fibrillar, directional adhesive assemblies may be slidably connected to the frame and may be arranged in different directions. Each of the at least two fibrillar, directional adhesive assemblies may include a carriage, a layer of fibrillar, directional adhesive and at least one load component. The carriage may have a first lateral side and a second lateral side adjacent to the first lateral side. The at least one load component may connect the layer of fibrillar, directional adhesive, the first lateral side and the second lateral side of the carriage, and may be capable of loading shear force from the carriage to the layer of fibrillar, directional adhesive along a first direction and a second direction substantially perpendicular to the first direction.

According to the present disclosure, the load component(s) of the fibrillar, directional adhesive assembly may transmit the loading shear force from the carriage to the layer of fibrillar, directional adhesive along a first direction (X direction) and a second direction (Y direction) when the fibrillar, directional adhesive assembly is loaded. Thus, load transmissions of a grasping device using the fibrillar, directional adhesive assembly may be decoupled, and the lateral load capacity of the grasping device may be improved.

BRIEF DESCRIPTION OF THE DRAWINGS

In order to clearly explain the technical solutions in the embodiments of the present disclosure, the drawings used in the detailed description will be briefly described below. The drawings in the following description are merely exemplary embodiments of the present disclosure. For those of ordinary

DETAILED DESCRIPTION

The disclosure will now be described in detail with reference to the accompanying drawings and examples. The described embodiments are exemplary and represent a subset of the embodiments contemplated by the present disclosure. Therefore, all other embodiments obtained by a person of ordinary skill in the art based on the embodiments of the present invention without creative efforts fall within the scope of the present disclosure.

Figure 1:
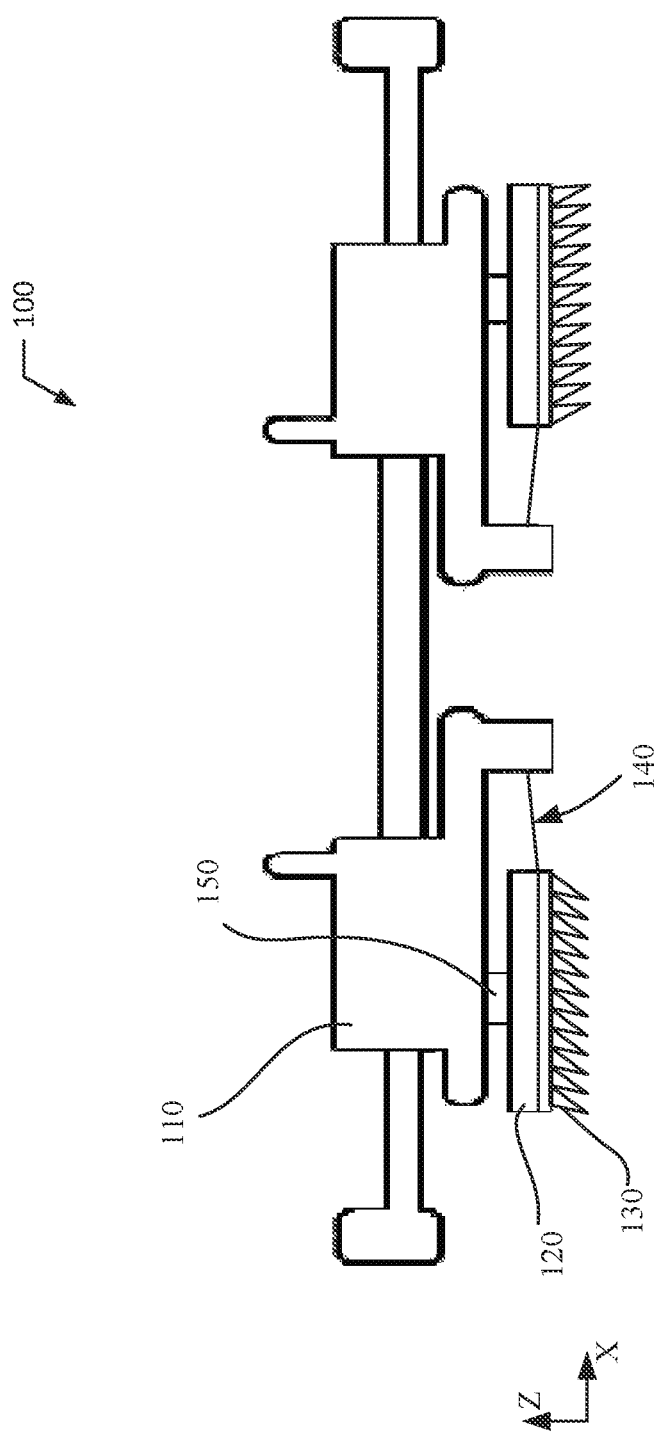
FIG. 1 illustrates a structural diagram of a gripper system with fibrillar, directional adhesive assemblies according to an exemplary embodiment of the present disclosure.
Figure 2:
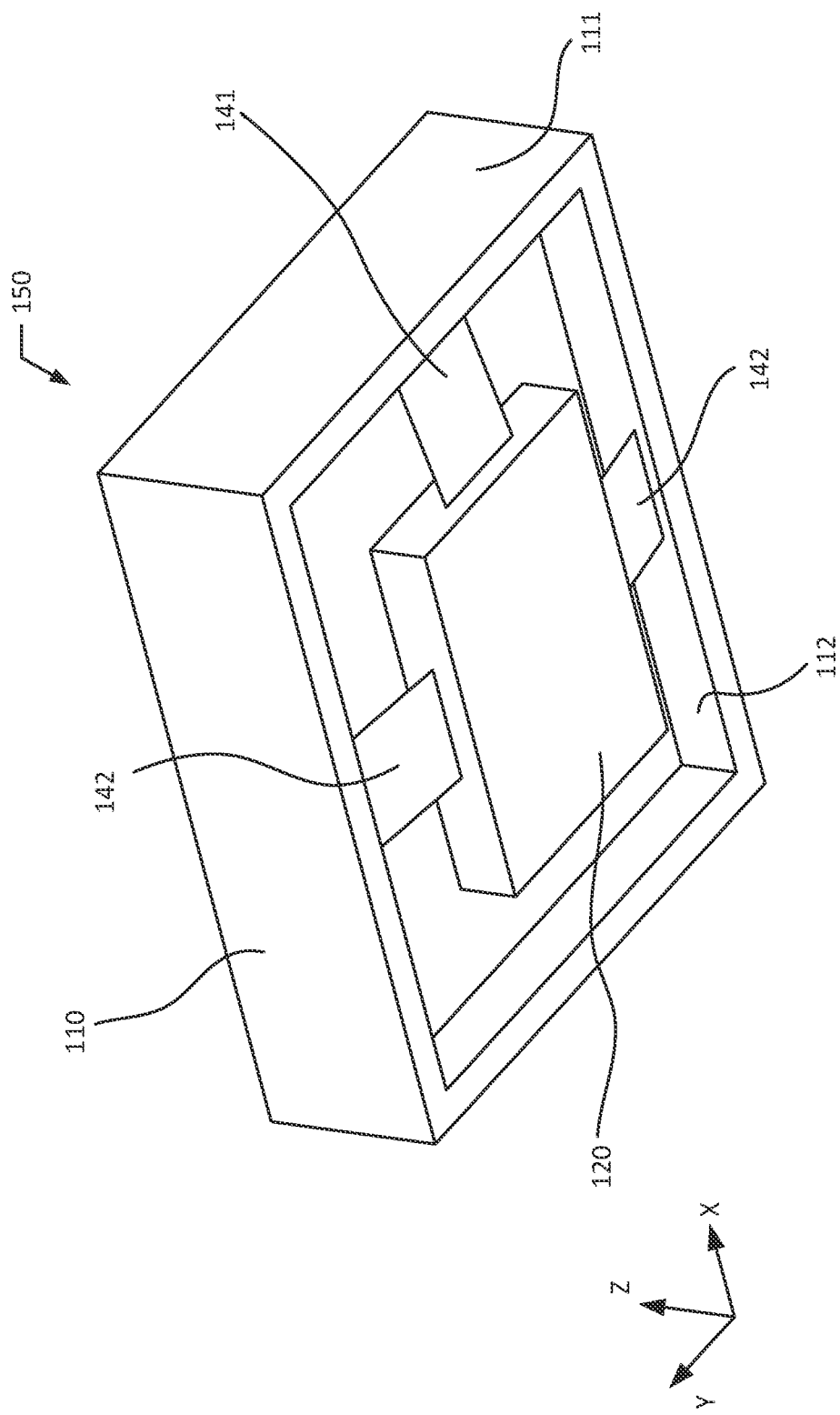
FIG. 2 shows an isometric view of part of a fibrillar, directional adhesive assemblies according to an exemplary embodiment of the present disclosure.

Referring to FIGS. 1 and 2, an exemplary structure of a gripper assembly 100 with fibrillar, directional adhesive assemblies is shown. In this embodiment, the gripper assembly 100 may include multiple fibrillar, directional adhesive assemblies (e.g., two fibrillar adhesive assemblies), which are configured to be loaded with internal shear forces in opposite directions and capable of supporting normal loads without shear. Each fibrillar, directional adhesive assembly of the gripper may include a carriage 110, a layer of fibrillar, directional adhesive 130 and at least one load component 140. As depicted in FIG. 1, the gripper assembly 100 includes two fibrillar, directional adhesive assemblies. For the sake of clarity, only the internal components of the left fibrillar, directional adhesive assembly are labeled, but it should be understood that the below discussion similarly applies to both the left and right fibrillar, directional adhesive assemblies.

The carriage 110 has a first lateral side 111 (in the X direction, as shown in FIG. 2) and a second lateral side 112 (in the Y direction, as shown in FIG. 2) adjacent to the first lateral side 111. The load component 140 may connect the layer of fibrillar adhesive 130, the first lateral side 113, and the second lateral side 112 of the carriage 110. The load component 140 may be capable of loading shear force from the carriage 110 to the layer of fibrillar adhesive 130 along a first direction and a second direction substantially perpendicular to the first direction, as discussed further below in connection with FIG. 2. The load component 140 may include, but is not limited to, e.g., tendon, rope, cord, film. The load component 140 may be substantially nonstretchable, e.g., substantially inextensible once pulled taut. The load component 140 may be made of, for example, polyimide, Kevlar, and/or polyester (PET).

The load component 140 of the fibrillar, directional adhesive assembly may transmit a loading shear force from the carriage 110 to the layer of fibrillar, directional adhesive 130 along a first direction (X direction) and, in certain implementations, a second direction (Y direction) when the fibrillar, directional adhesive assembly is loaded. In such implementations, the sub-component of the load component 140 in the X directional may provide significantly larger stiffness in the X direction than in the Y direction, whereas the sub-component of the load component 140 in the Y directional provides significantly larger stiffness in the Y directional than in the X direction. As a result, the adhesive force in the X direction may be mainly taken by the X component of the load component 140, and the adhesive force in the Y direction is mainly taken by the Y component of the load component 140. Thus, load transmissions of a grasping device using the fibrillar, directional adhesive assembly may be decoupled, and the lateral load capacity of the grasping device may be improved.

In some embodiments, the load component 140 may connect directly to the layer of fibrillar, directional adhesive 130. In other embodiments, the fibrillar, directional adhesive assembly may further include a backing component 120. The layer of fibrillar, directional adhesive 130 may be attached to the backing component 120, and the load component 140 may connect to the layer of fibrillar, directional adhesive through the backing component 120.

In certain implementations, the backing component 120 may be rigid. For example, the backing component 120 may have large stiffness in all linear and bending directions such that the layer of fibrillar, directional adhesive does not experience significant stress concentration when under loads in all directions, and may be made of, for example, acrylic, nylon, aluminum, steel, titanium, copper, brass, polycarbonate, acetal, wood. Such implementations of the backing component 120 may enable more uniform loading of the layer of fibrillar, directional adhesive 130.

FIG. 2 illustrates an exemplary fibrillar, directional adhesive assembly 150, which may be an implementation of the fibrillar, directional adhesive assemblies of the gripper assembly 100 described above. As shown in FIG. 2, the load component 140 may include a first load component 141 and a second load component 142. The first load component 141 may connect the layer of adhesive 130 and the first lateral side 111 of the carriage 110, while the second load component 142 may connect the layer of fibrillar, directional adhesive 130 and the second lateral side 112 of the carriage 110. Therefore, the load component 140 may be capable of transmitting loading force from the carriage 110 to the layer of fibrillar, directional adhesive 130 along the X direction and the Y direction via the first and second load components 141, 142, respectively.

In some embodiments, the load component 140 may include multiple sub-components. That is, the first load component 141 and the second load component 142 may be implemented individually (e.g., as separate pieces of material and/or film). These sub-components may connect the layer of fibrillar, directional adhesive 130 and the carriage 110 in different directions, such that they are capable of loading shear force from the carriage to the layer of fibrillar, directional adhesive 130 along different directions including the X direction and Y direction as shown in FIG. 2.

In other embodiments, the load component 140 may alternatively be a single loading film. In such implementations, the first load component 141 and the second load component 142 may cooperatively constitute the load component 140 (e.g., as a single, connecting piece of material and/or film), such that the load component 140 may connect both the first lateral side 111 and the second lateral side 112 of the carriage 110 and is capable of loading shear forces in both the X direction and the Y direction from the carriage to the layer of fibrillar, directional adhesive 130.

Figure 3:
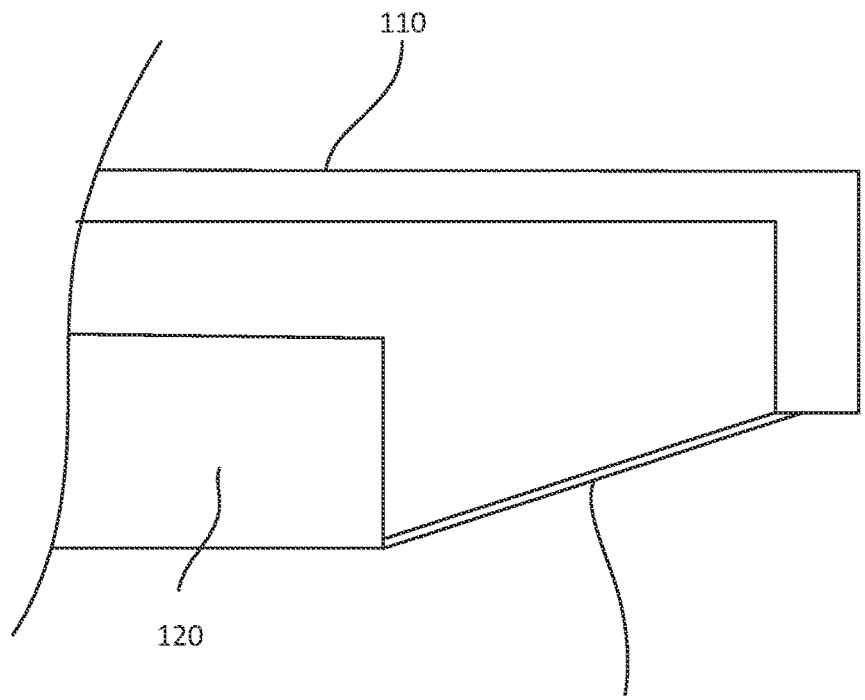
FIG. 3 is an illustrative embodiment illustrating a schematic structure of part of a fibrillar, directional adhesive assemblies according to an exemplary embodiment of the present disclosure.
Figure 4:
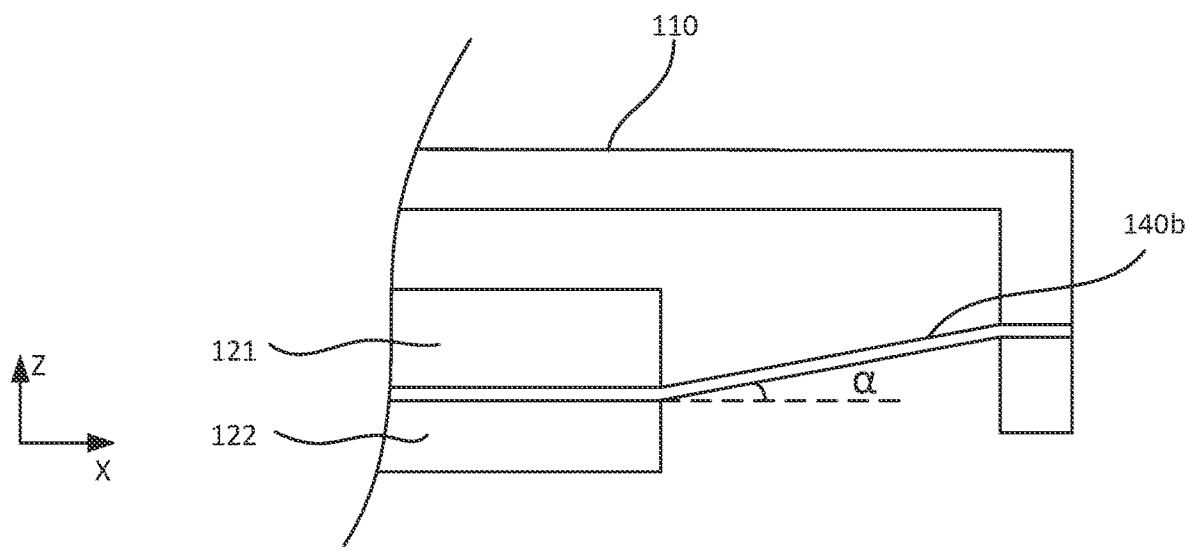
FIG. 4 is an illustrative embodiment illustrating a schematic structure of part of a fibrillar, directional adhesive assemblies according to an exemplary embodiment of the present disclosure.

FIGS. 3 and 4 show exemplary implementations of the load component 140. The load component 140 may connect to the backing component 120 and the layer of fibrillar adhesive 130 in different configurations. For example, as shown in FIG. 3, the load component 140a may be connected to the bottom surface of the backing component. The load component 140a may also connect to the top surface or the lateral surface of the backing component 120 in other implementations. Alternatively, as shown in FIG. 4, the backing component 120 may be composed of multiple layers of rigid material 121, 122 stacked together. In such instances, the load component 140b may be sandwiched between two of the layers of rigid material 121, 122. In the X-Z plane as shown in FIG. 4, there may exist an angle α between the extending direction of the load component 140b and that of the layer of fibrillar adhesive 130, which allows the loading force to run substantially through the center of the layer of fibrillar, directional adhesive 130 and helps avoid stress concentration. The angle α may range from, for example, 0 to 25 degrees, although other implementations are possible. The angle α is a design parameter and may be optimized for specific applications. The geometry shown in FIGS. 3 and 4 may be adjusted with different sizes and structures of the backing component 120 (e.g., different thicknesses of the layers of rigid material 121, 122) and the carriage 110 to maintain an ideal angle α.

Referring back to FIG. 1, the fibrillar adhesive assembly may further include a deformable component 150 attached between the carriage 110 and the backing component 120. Specifically, the carriage 110 may have a bottom surface facing the backing component 120, and the backing component 120 may have a top surface facing the carriage 110. The deformable component 150 may be attached between the bottom surface of the carriage 110 and the top surface of the backing component 120. The deformable component 140 may be, for example, a silicone or urethane foam, a compressive spring, a metal or plastic flexure, or an air or fluid bag. The deformable component 140 may provide flexibility and enable the rigid backing component 120 to conform to the surface of the object to be grasped.

Figure 5:
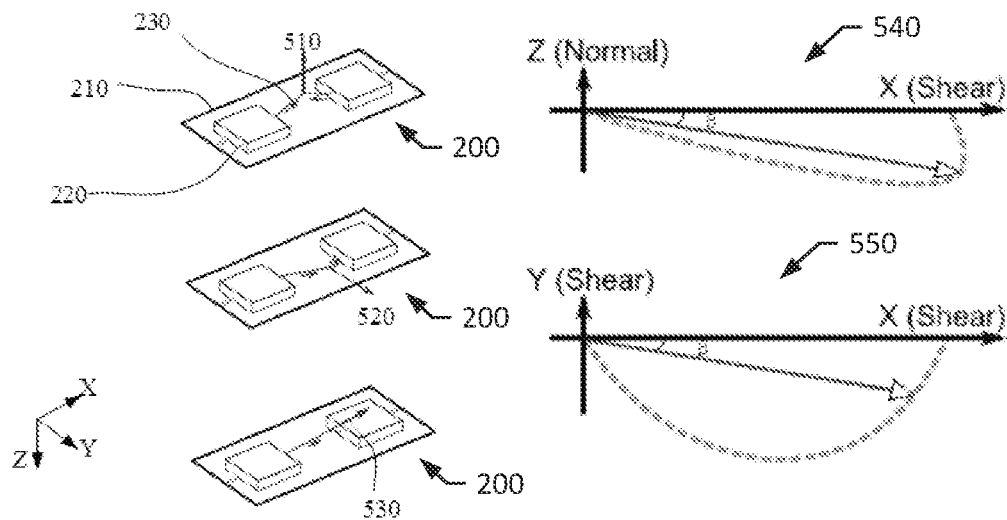
FIG. 5 shows an adhesion limit of a gripper unit according to an exemplary embodiment of the present disclosure.

FIG. 5 depicts a gripper unit 200 under various loading conditions 510, 520, 530. The gripper unit 200 includes a loading component 230 that does not include a Y-direction load component. That is, under the loading conditions 510, 520, 530, the load component 230 loads shear force along all three directions (i.e., the X, Y, and Z directions). It should be understood, the loading conditions 510, 520, 530 may be applied directly to the load component 230 or may alternatively be connected to a frame 210 upon which the load 510, 520 or 530 is applied.

The gripper unit 200 includes a fibrillar, directional adhesive 220. The dotted lines in the diagrams 540, 550 respectively indicate the adhesion limits of the fibrillar, directional adhesive 220 in the X-Z and X-Y planes. The adhesion limits may be determined by the material and microstructure of the fibrillar, directional adhesive 220 itself. The loading angle β in the X-Z plane may be selected by varying the geometry of the loading tendons to optimize the adhesion performance of the gripper system in the X direction and Z direction (i.e., by directing the load to the largest portion of the loading trajectory depicted in diagram 540). However, load transmissions in the depicted configuration within the fibrillar, directional adhesive 220 are coupled in all three directions (i.e., the loading angle in the X-Y plane is also equal to β, the loading angle in the X-Z plane). Therefore, overall adhesion capacity of the fibrillar, directional adhesive is limited in the gripper unit 200, especially in the Y direction, because of the comparatively lower Y-direction adhesion limit at the selected load angle β. Specifically, the determined loading angle β for optimizing the X- and Z-direction adhesion capacity constrains the loading angle in the X-Y plane, thereby limiting the Y-direction adhesion capacity, despite the overall adhesion limit of the fibrillar, directional adhesive in the X-Y plane depicted in diagram 550 still allowing larger loads in the Y direction at other loading angles.

Moreover, the load component 230 is designed such that, with loads only in the X-Z plane, the extension of the load component 230 directs the load through the center of the fibrillar, directional adhesive 220. However, when a load has a Y-direction component, such as the load 520, the load component 230 cannot direct the load through the center of the fibrillar, directional adhesive 220, which introduces a twisting moment about the Z axis on each fibrillar, directional adhesive 220. This effect wastes adhesion capabilities on withstanding the twisting moment instead of bearing a load, further impairing the loading capability in the Y direction.

Figure 6:
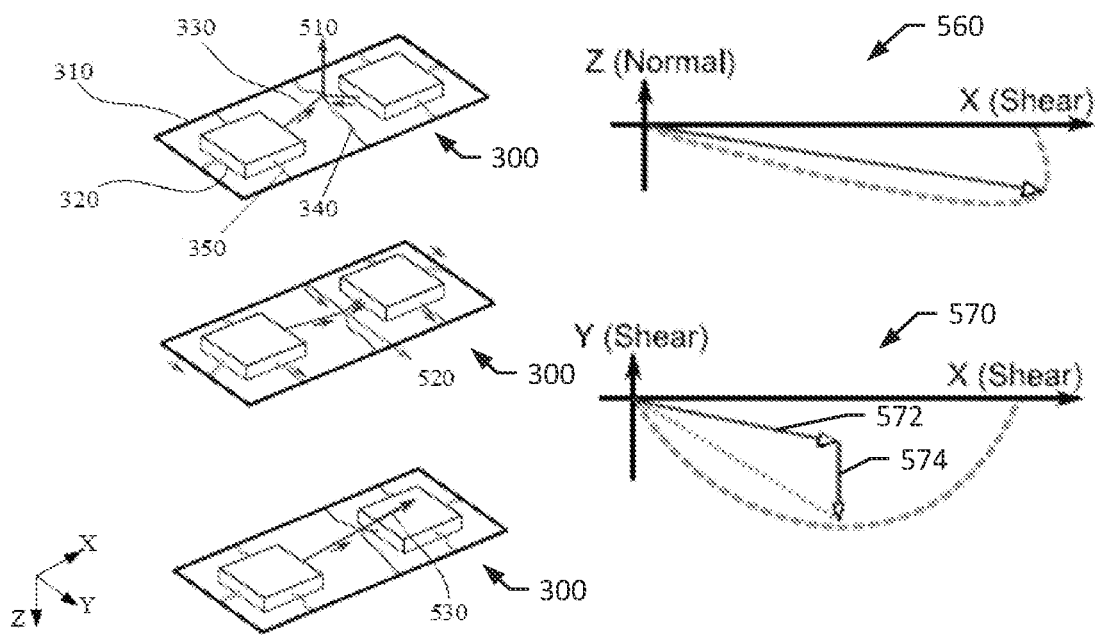
FIG. 6 shows an adhesion limit of a gripper unit according to another exemplary embodiment of the present disclosure.

FIG. 6 depicts a gripper unit 300 under the loading conditions 510, 520, 530. Unlike the gripper unit 200, the gripper unit 300 includes a frame 310 with both X-direction load components 330 and Y-direction load components 350, along with support tendons 340. The support tendons 340 may connect the frame 310 and the X-direction load component 330 in the Y direction. It should be understood, the support tendon 340 may be a real tendon, or may represent a mathematical or physical model of the overall gripper unit structure. In certain implementations, the support tendon 340 may be implemented by the carriage 110.

When a Z-direction load (e.g., the load 510) is applied to the load component 330, the load component 330 is tensioned while the support tendon 340 does not take load because the load 510 does not include a Y-direction component, so both the Y-direction load components 350 are slack. Thus, the X and Y direction adhesion capacity of the gripper system shown in FIG. 6 may be similar to that shown in FIG. 5, as shown in the loading trajectory depicted in diagram 560.

When a Y-direction load (e.g., the load 520) is applied to the load component 330, at first the Y-direction load component 350 may remain slack and the relation between the Y-direction shear force and the X-direction shear force applied on the fibrillar, directional adhesive 320 may develop similarly to that shown in FIG. 5, which is also shown in the line 572 of the loading trajectory depicted in diagram 570. This process can be considered a preloading process. During the preloading process, the frame 310 may shift slightly in the Y direction, taking up the slack in the Y-direction load component 350. After the frame 310 shifts enough that Y-direction load component 350 is taut, the remaining Y direction load 520 may be transmitted by the support tendon 340 to the frame 310, and may then pass to the fibrillar adhesive 320 through the Y-direction load component 350. In such scenarios, the Y-direction load 520 may be almost completely transmitted to the fibrillar, directional adhesive by the Y-direction load component 350. With the addition of the Y-direction load component 350, Y-direction load transmission for the gripper unit 300 may be decoupled from that in the X direction, and the adhesion capacity of the gripper system in the Y direction may be improved, as illustrated by the line 574 in the diagram 570.

In some embodiments, the deformable component 150 as shown in FIG. 1 may be replaced by a vertical tension component (not depicted). That is, the vertical tension component may take the place of the deformable component 150 and connect between the carriage 110 and the backing component 120. The vertical tension component may be capable of transmitting a normal load force from the carriage 110 to the layer of fibrillar, directional adhesive 130 along the Z direction, as illustrated in FIG. 1. In such embodiments, the part of the load component 140 connecting between the layer of fibrillar, directional adhesive 130 (or the backing component 120 and the carriage 110) may extend parallel to the layer of fibrillar, directional adhesive 130.

Figure 7:
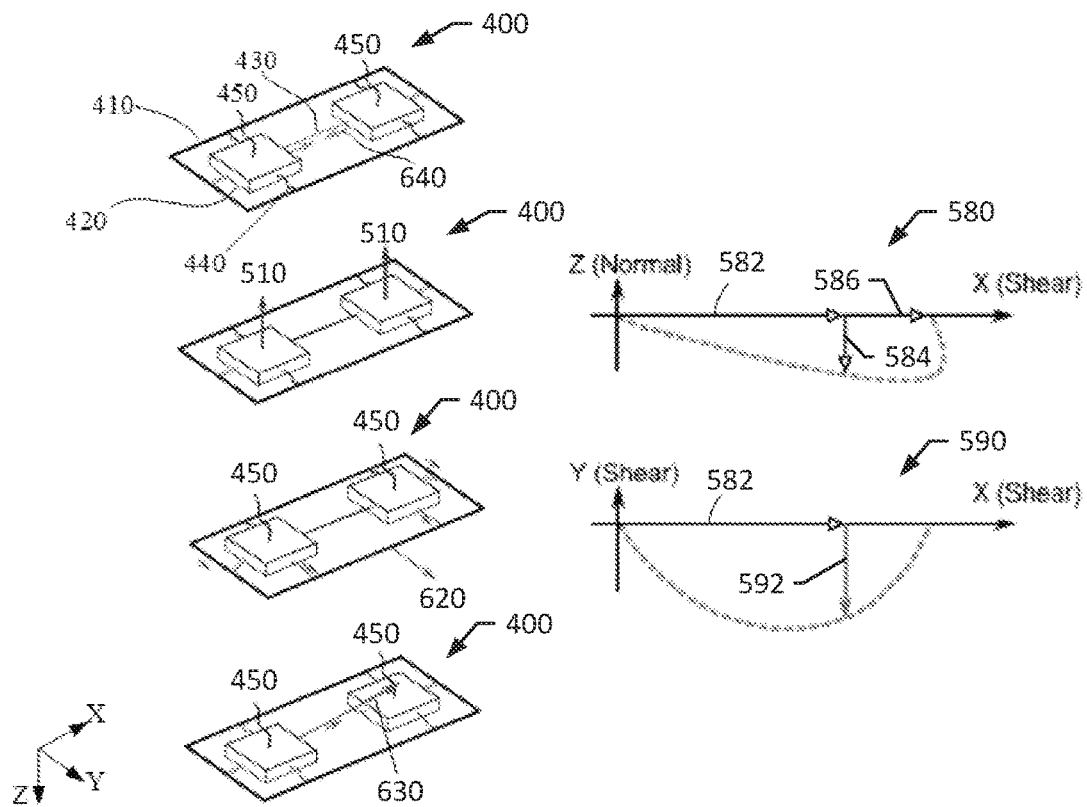
FIG. 7 shows an adhesion limit of a gripper unit according to another exemplary embodiment of the present disclosure.

Certain embodiments of such a fibrillar, directional adhesive assembly may be implemented in a modified gripper unit with isolated load components, such as the gripper unit 400 depicted in FIG. 7. The gripper unit 400 includes an X-direction load component 430, Y-direction load components 440 (only one of which is labeled for simplicity), and Z-direction load components 450 which connect the fibrillar, directional adhesive 420 and the frame 410 (or may connect the fibrillar, directional adhesive 420 to another fibrillar adhesive). The X-direction load component 430 and the Y-direction load component 440 may extend parallel or nearly parallel to the fibrillar, directional adhesive 420. The X-direction load component 430 may be configured to transmit an X-direction load (e.g., the load 630) to the fibrillar, directional adhesive 420, the Y-direction load component 440 may be configured to transmit a Y-direction load (e.g., the load 620) to the fibrillar, directional adhesive 420, and the Z-direction load component 450 may be configured to transmit Z-direction loads (e.g., the load 610) to the fibrillar, directional adhesive 420. It should be understood that, in certain implementations, one or more of the load components 430, 440, 450 may represent a mathematical or physical model of the gripper unit 400. In still further implementations, the load components may represent actual structure of the gripper unit 400.

Figures 8A, 8B, 8C:
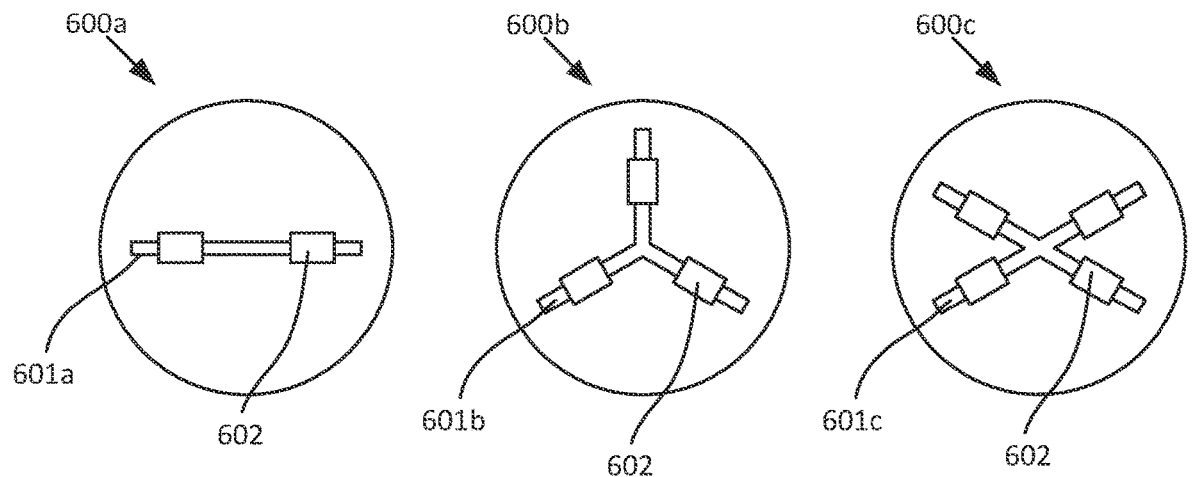
FIGS. 8(a)-8(c) illustrate schematic diagrams of a gripper with multiple fibrillar, directional adhesive assemblies according to exemplary embodiments of the present disclosure.

Such configurations may decouple load transmissions of the gripper system along all three directions. As illustrated in the loading trajectories depicted in diagrams 580, 590, the X-direction load component 430 may be preloaded with a preload in the X-direction. The preload may be selected based on the loading trajectories of the directional, fibrillar adhesive to improve the adhesion capacity of the gripper unit in the Z and Y directions. For example, in the loading trajectory depicted in diagram 580, the preload may be selected, as illustrated by the line 582, to enable increased Z-direction adhesion capacity, as illustrated by the line 584. The preload may also be selected to leave additional X-direction load capacity, illustrated by the line 586. Continuing this example, the preload, in the X-Y plane may also result in increased Y-direction adhesion capacity, illustrated by the line 592 in the diagram 590. FIGS. 8(a), (b), and (c) depict gripper assemblies 600a, 600b, 600c according to exemplary embodiments of the present disclosure. The gripper assemblies 600a, 600b and 600c may each include a frame 601a, 601b or 601c and at least two fibrillar, directional adhesive assemblies 602. The fibrillar, directional adhesive assemblies 602 may be implemented at least in part based on any of the above-discussed embodiments. The fibrillar, directional adhesive assemblies 602 may be slidably connected to the frame 601a, 601b or 601c and may be arranged in different directions. For example, the frame 601a, 601b or 601c may be a rail, and the carriage of each of the adhesive assemblies 602 may be slidably connected to the rail such that each adhesive assembly 602 may be controlled to move along the rail. In other examples, the frame 601a, 601b, or 601c may be implemented as a rod, beam, or other slidable mechanism.

In some embodiments, the gripper unit 600a includes two fibrillar, directional adhesive assemblies 602, as shown in FIG. 8(a). Fiber angles of the fibrillar, directional adhesive of the two fibrillar, directional adhesive assemblies 602 may be arranged opposite to each other. Therefore, when the two fibrillar, directional adhesive assemblies 602 are pushed away from each other (or pulled towards each other) along the frame 601a, the fibers of the fibrillar, directional adhesive may be loaded (or unloaded) with internal shear force, and adhesion of the gripper 600a may be correspondingly activated (or deactivated). Similarly, the gripper units 600b or 600c include more than two fibrillar, directional adhesive assemblies 602. In such implementations, the fiber angles of the fibrillar, directional adhesives 602 may all point to the center of the frame 601b, 601c, or alternatively may all point in the opposite direction (e.g., away from the center). Therefore, when the fibrillar, directional adhesive assemblies 602 are pushed away from the center or pushed toward the center of the frame 601b, 601c, adhesion of the gripper 600b or 600c may be activated or deactivated.

In some embodiments, the gripper unit 600a, 600b or 600c may further include a preloading mechanism or a pushing mechanism (not shown). The preloading mechanism or the pushing mechanism may be configured to push or pull the fibrillar, directional adhesive assemblies 602 to slide close to or away from each other for activation and deactivation of adhesion of the gripper. The preloading mechanism may include, for example, one or more passive or active mechanical, electrical, pneumatic, hydraulic mechanisms or structures (e.g., as springs, motors, cylinders), although other implementations are possible.

It should be understood that the number of the fibrillar, directional adhesive assemblies 602 included in the gripper 600a, 600b, 600c are not limited to the specific embodiments discussed and depicted in the present disclosure. In practice, embodiments of the gripper 600a, 600b, 600c may include additional or fewer fibrillar, directional adhesive assemblies 602 than the embodiments described above.

Figure 9:
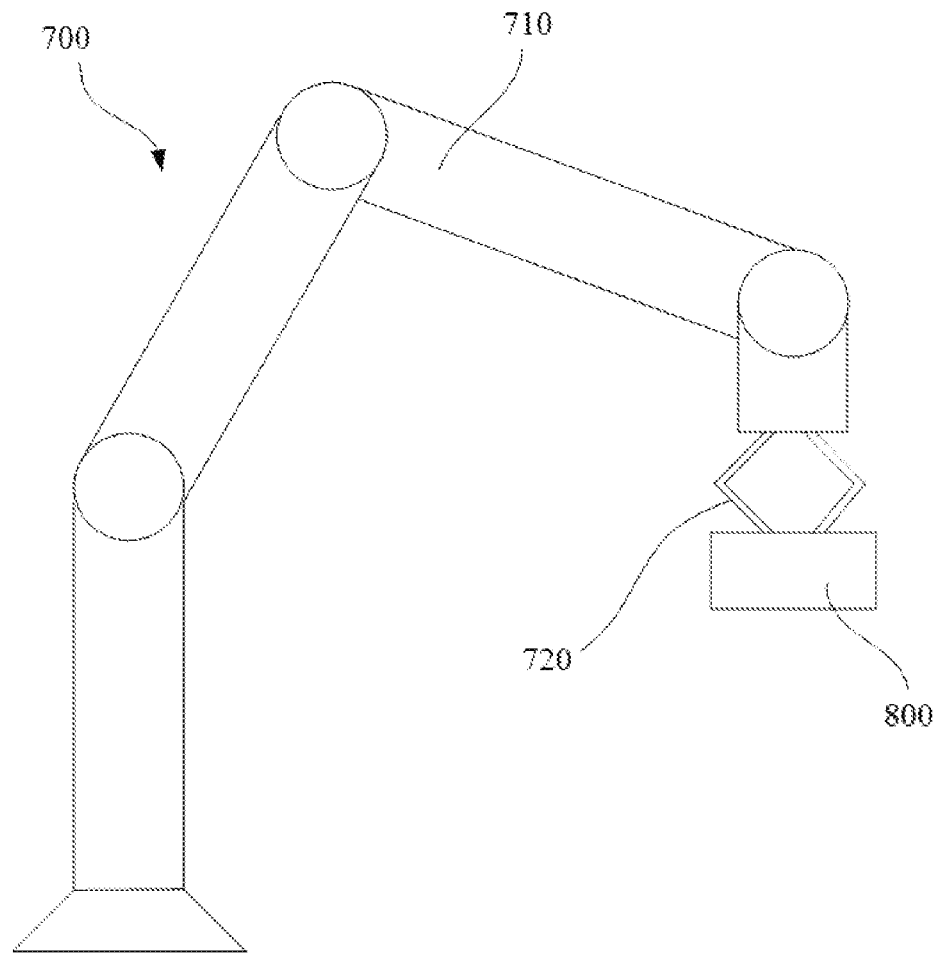
FIG. 9 shows a structural diagram of a robot with a gripper according to an exemplary embodiment of the present disclosure.

Referring to FIG. 9, the present disclosure also provides a robot 700. The robot 700 may include several links 710 and a gripper 720 (e.g., an end effector). The robot 700 may be utilized to grasp or catch a workpiece 800. In particular, the gripper 720 may include a gripper unit or assembly according to any of the previously-discussed embodiment, such as the gripper units 200, 300, 400 and the gripper assemblies 100, 600a, 600b, 600c. Those of ordinary skill should understand that the structure shown in FIG. 9 is just an exemplary embodiment of the robot 700. In other embodiments, the robot 700 may include more components or less components, such as additional links 710 and end effectors. Some components (e.g., two or more links) may be combined and different or additional types of components may be employed than those depicted. For example, the robot may further include an I/O device, a network accessing device, a communication bus, a processor, a memory, actuators, and sensors. These additional components may implement a control system, such as the control signals discussed above. For example, the robot 700 may include a processor and a memory storing instructions which, when executed by the processor, cause the processor to implement the control system. The memory may also store instructions which, when executed by the processor, cause the processor to activate or deactivate the gripper 720 so as to catch or release the workpiece 800.

The foregoing is merely embodiments of the present disclosure, and is not intended to limit the scope of the disclosure. Any transformation of equivalent structure or equivalent process which uses the specification and the accompanying drawings of the present disclosure, or directly or indirectly application in other related technical fields, are likewise included within the scope of the protection of the present disclosure.

What is claimed is:

1. A fibrillar, directional adhesive assembly, comprising:
a carriage having a first lateral side, a second lateral side adjacent to the first lateral side, and a bottom surface;
a backing component having a top surface facing the carriage, wherein the bottom surface of the carriage faces the backing component;
a layer of fibrillar, directional adhesive attached to the backing component;
at least one load component connecting the layer of fibrillar, directional adhesive, the first lateral side and the second lateral side of the carriage, wherein the load component is capable of loading shear force from the carriage to the layer of fibrillar, directional adhesive along a first direction and a second direction substantially perpendicular to the first direction, and wherein the at least one load component connects to the layer of fibrillar, directional adhesive through the backing component; and
a deformable component attached between the bottom surface of the carriage and the top surface of the backing component.

2. The fibrillar, directional adhesive assembly of claim 1, wherein the at least one load component comprises:
a first load component connecting the backing component and the first lateral side of the carriage, wherein the first load component is capable of loading shear force from the carriage to the layer of fibrillar, directional adhesive along the first direction; and
a second load component connecting the backing component and the second lateral side of the carriage, wherein the second load component is capable of loading shear force from the carriage to the layer of fibrillar, directional adhesive along the second direction.

3. The fibrillar, directional adhesive assembly of claim 1, wherein the at least one load component is one loading film, and
wherein the loading film connects both the first lateral side and the second lateral side of the carriage such that the loading film is capable of loading shear force from the carriage to the layer of fibrillar, directional adhesive along both the first direction and the second direction.

4. The fibrillar, directional adhesive assembly of claim 3, wherein the backing component comprises at least two layers of rigid material stacked together, and the loading film is positioned between the at least two layers of rigid material.

5. The fibrillar, directional adhesive assembly of claim 1, further comprising:
a vertical tension component connecting the carriage and the backing component, wherein the vertical tension component is capable of transmitting a normal load force from the carriage to the layer of fibrillar, directional adhesive along a third direction substantially perpendicular to the first direction and the second direction.

6. The fibrillar, directional adhesive assembly of claim 5, wherein
at least a portion of the at least one load component which connects to the first side of the carriage extends substantially parallel to the layer of fibrillar, directional adhesive.

7. A gripper comprising:
a frame; and
at least two fibrillar, directional adhesive assemblies slidably connected to the frame, and arranged in differing directions, each of the at least two fibrillar, directional adhesive assemblies comprising:
a carriage having a first lateral side, a second lateral side adjacent to the first lateral side, and a bottom surface;
a backing component having a top surface facing the carriage, wherein the bottom surface of the carriage faces the backing component;
a layer of fibrillar, directional adhesive attached to the backing component;
at least one load component connecting the layer of fibrillar, directional adhesive, the first lateral side, and the second lateral side of the carriage, wherein the at least one load component is capable of loading shear force from the carriage to the layer of fibrillar, directional adhesive along a first direction and a second direction substantially perpendicular to the first direction, and wherein the at least one load component connects to the layer of fibrillar, directional adhesive through the backing component; and
a deformable component attached between the bottom surface of the carriage and the top surface of the backing component.

8. The gripper of claim 7, wherein the at least one load component comprises:
a first load component connecting the backing component and the first lateral side of the carriage, wherein the first load component is capable of loading shear force from the carriage to the layer of fibrillar, directional adhesive along the first direction; and
a second load component connecting the backing component and the second lateral side of the carriage, wherein the second load component is capable of loading shear force from the carriage to the layer of fibrillar, directional adhesive along the second direction.

9. The gripper of claim 7,
wherein the at least one load component is a loading film, and
wherein the loading film connects both the first lateral side and the second lateral side of the carriage such that the loading film is capable of loading shear force from the carriage to the layer of fibrillar, directional adhesive along both the first direction and the second direction.

10. The gripper of claim 9, wherein the backing component comprises at least two layers of rigid material stacked together, and the loading film is positioned between the at least two layers of rigid material.

11. The gripper of claim 7, wherein each of the at least two fibrillar, directional adhesive assemblies further comprises:
- a vertical tension component connecting between the carriage and the backing component, wherein the vertical tension component transmits a normal load force from the carriage to the layer of fibrillar, directional adhesive along a third direction substantially perpendicular to the first direction and the second direction, and
- wherein at least a portion of the at least one load component which connects to the first side of the carriage extends substantially parallel to the layer of fibrillar, directional adhesive.

12. The gripper of claim 7,
- wherein fiber angles of the fibrillar, directional adhesive of the at least two fibrillar, directional adhesive assemblies are directed either toward or away from a center of the fibrillar, directional adhesive assembly, and
- wherein the gripper further comprises a preloading mechanism configured to drive the two fibrillar, directional adhesive assemblies to slide towards and away from the center of the fibrillar, directional adhesive assembly for activation and deactivation of the gripper.

13. A robot with a gripper comprising:
- a frame; and
- at least two fibrillar, directional adhesive assemblies slidably connected to the frame, and arranged in different directions, each of the at least two fibrillar, directional adhesive assemblies comprising:
  - a carriage having a first lateral side, a second lateral side adjacent to the first lateral side, and a bottom surface;
  - a backing component having a top surface facing the carriage, wherein the bottom surface of the carriage faces the backing component;
  - a layer of fibrillar, directional adhesive attached to the backing component;
  - at least one load component connecting the layer of fibrillar, directional adhesive, the first lateral side, and the second lateral side of the carriage, wherein the at least one load component is capable of loading shear force from the carriage to the layer of fibrillar, directional adhesive along a first direction and a second direction substantially perpendicular to the first direction, and wherein the at least one load component connects to the layer of fibrillar, directional adhesive through the backing component; and
  - a deformable component attached between the bottom surface of the carriage and the top surface of the backing component.

14. The robot of claim 13,
- wherein the at least one load component comprises a single loading film that connects both the first lateral side and the second lateral side of the carriage such that the loading film is capable of loading shear force from the carriage to the layer of fibrillar, directional adhesive along both the first direction and the second direction, and
- wherein the backing component comprises at least two layers of rigid material stacked together, and the loading film is positioned between the at least two layers of rigid material.

15. The robot of claim 13, wherein each of the at least two fibrillar, directional adhesive assemblies further comprises:
- a vertical tension component connecting the carriage and the backing component, wherein the vertical tension component is capable of transmitting a normal load force from the carriage to the layer of fibrillar, directional adhesive along a third direction substantially perpendicular to the first direction and the second direction,
- wherein at least a portion of the at least one load component which connects to the first side of the carriage extends substantially parallel to the layer of fibrillar, directional adhesive.

\* \* \* \* \*